United States Patent [19]

Borovicka, Sr.

[11] Patent Number: 4,540,735
[45] Date of Patent: Sep. 10, 1985

[54] METHOD OF PRODUCING LOW TEMPERATURE CURE LATEXES

[75] Inventor: David A. Borovicka, Sr., Parma, Ohio

[73] Assignee: SCM Corporation, New York, N.Y.

[21] Appl. No.: 603,692

[22] Filed: Apr. 25, 1984

[51] Int. Cl.³ .............................................. C08L 33/26
[52] U.S. Cl. .................................... 524/512; 524/555
[58] Field of Search ............................... 524/512, 555

[56] References Cited

U.S. PATENT DOCUMENTS

| | | | |
|---|---|---|---|
| 3,533,826 | 10/1970 | Falgiatore | 524/512 |
| 3,635,867 | 1/1972 | Yuille | 524/512 |
| 3,796,679 | 3/1974 | Kujas | 524/512 |
| 3,979,348 | 9/1976 | Ballweber | 524/512 |
| 4,002,699 | 1/1977 | Labana | 524/512 |
| 4,048,130 | 9/1977 | Brunold | 524/512 |
| 4,442,257 | 4/1984 | Borovicka et al. | 524/555 |
| 4,444,941 | 4/1984 | Borovicka et al. | 525/375 |

OTHER PUBLICATIONS

Rose, *The Condensed Chemical Dictionary*, 7th ed.; p. 589; Reinhold, N.Y., 1961.

*Primary Examiner*—C. Warren Ivy
*Attorney, Agent, or Firm*—Thomas M. Schmitz

[57] ABSTRACT

A process for preparing improved polymeric binder for use in protective surface coatings comprising heat reacting glycoluril or melamine with a time sufficient to partially coreact or otherwise associate the glycoluril or melamine with the reactive emulsion polymer.

5 Claims, No Drawings

METHOD OF PRODUCING LOW TEMPERATURE CURE LATEXES

BACKGROUND OF THE INVENTION

This invention relates to an improved method of producing thermosetting emulsion polymer mixtures containing glycoluril or melamine crosslinker where the polymeric mixture is heat treated to produce a minor amount of heat reaction between the glycoluril or melamine and the coreactive emulsion polymer. The reactive emulsion polymer can contain reactive hydroxyl, carboxyl, or acrylamide groups adapted to be crosslinked by the glycoluril or melamine to produce a cured coating film as set forth in commonly assigned U.S. Pat. No. 4,442,257 and Ser. No. 413,728 filed Sept. 1, 1982, now U.S. Pat. No. 4,444,941, and the same are incorporated herein by reference.

Glycoluril compositions are known for use in solvent based coating compositions in U.S. Pat. No. 4,064,191 and for use in powder coatings in U.S. Pat. No. 4,118,437. Aqueous glycoluril coatings are disclosed in prior patent U.S. Pat. No. 4,442,257 and said Ser. No. 413,728.

It now has been found that substantially improved clear and pigmented coatings based on glycoluril or melamine and reactive emulsion polymers can be produced by heat reacting the mixture for a limited period of time prior to use to provide a minor amount of reaction between the glycoluril or melamine and the reactive emulsion polymer. Heat treating the aqueous polymer mixture at temperatures above about 50° C. for times of about one hour or more surprisingly provides substantially improved cured films exhibiting improved gloss, clarity, coating holdout over porous substrates, improved blocking resistance and a desirable rate of cure as well as enabling the use of considerably reduced amounts of glycoluril or melamine crosslinker to obtain excellent cured crosslinked film. The heat treating step of the aqueous polymeric mixture is believed to provide a minor amount of coreaction between the glycoluril or melamine and the reactive emulsion polymer whereby the glycoluril or melamine is believed to be physically drawn into or incorporated into the reactive emulsion polymer molecule. It is theorized that minor coreaction between the glycoluril or melamine and the reactive groups on the reactive emulsion polymer cause the glycoluril to diffuse into or associate with the reactive emulsion polymer and additionally provide an interpenetrating polymeric network and close association between the two polymer structures. These and other advantages of this invention will become more apparent by referring to the detailed description and the illustrative examples.

SUMMARY OF THE INVENTION

Briefly, the inventive process is directed to mildly heating an aqueous mixture of glycoluril or melamine with a reactive emulsion polymer at temperatures above about 50° C. for time sufficient to coreact a minor amount of glycoluril or melamine with reactive emulsion polymer to cause an improved intermixture of the polymeric components. Cured films from the heat treated polymeric mixture exhibits substantially improved film properties.

DETAILED DESCRIPTION OF THE INVENTION

The thermosetting polymeric composition containing glycoluril or melamine and reactive emulsion polymer is heat treated at temperatures above about 50° C., preferably between about 60° C. and 90° C., for time sufficient less than two hours, preferably between 0.5 and 1 hours, to cause minor heat promoted coreaction between the glycoluril or melamine and the coreactive emulsion polymer. The heated aqueous solution permits minor coreaction but does not promote extensive crosslinking or gelling to occur as subsequently occurs when a film is applied to a substrate and cured.

Referring first to the reactive emulsion polymer, the reactive polymer contains reactive hydroxyl, carboxyl, or acrylamide groups and comprises copolymerized ethylenically unsaturated monomers including at least about 10% copolymerized reactive monomers of acrylamide, carboxyl monomer, or hydroxyl monomer. Preferably the polymer contains polymerized monomer by weight comprising between 0% and 20% acrylamide, between 0% and 10% carboxyl monomer, and between 0% and 20% hydroxyl monomer, provided at least 10% reactive functional monomer is used with the balance being other ethylenic monomers. The acrylamide monomers can be acrylamide, methacrylamide, ethyacrylamide, acrylonitrile, methacrylonitrile, and similar atoms alkyl acrylamide and methacrylamide monomers; provided that a minor amount of N-alkanol amide monomers is included to provide a polymer containing at least 1.5% by weight of copolymerized N-alkanol amide monomer for example, N-methylol acrylamide, N-ethanol acrylamide, N-propanol acrylamide, N-methylol methacrylamide, N-ethanol methacrylamide, and similar acrylamides and methacrylamide. Carboxyl containing monomers are ethylenically unsaturated monomers containing carboxyl groups such as acrylic, methacrylic, or ethacrylic acid, as well as itaconic, citriconic, fumaric, maleic, mesaconic and aconitric acids. The preferred acids are acrylic and methacrylic acids. Hydroxyl containing monomers are ethylenically unsaturated monomers containing a hydroxyl and can include for example hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Ethylenically unsaturated monomers other than acrylamide, carboxyl, and hydroxyl monomers can include vinyl unsaturated monomers containing vinyl double bond unsaturation including, for example, vinyl esters such as vinyl acetate, vinyl proprionate, vinyl butyrates, vinyl benzoate, isopropenyl acetate and like vinyl esters; vinyl amides, such as acrylamide; and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl naphtalene, divinyl benzene, diallyl phthalate and similar diallyl derivatives, butadiene, alkyl esters of acrylic and methacrylic acid and similar ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy or azo catalyst, common redox catalyst, ultraviolet radiation, or the like.

The reactive emulsion polymer containing reactive hydroxyl, carboxyl groups or acrylamide groups is adapted to be cross-linked by reaction with a glycoluril derivative. Glycoluril derivatives are disclosed in U.S. Pat. No. 4,064,191 and are also known as acetylendiureas. Glycolurils are derived by reacting two moles of urea with one mole of glyoxal to provide a complex ring structure illustrated as follows:

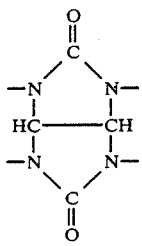

The substitutes constituents can be a hydrogen, or a lower alkyl radical, or can be methylolated partially or fully by reacting with 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methyolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxmethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxy ethylene urea which is believed to have the chemical structure as follows:

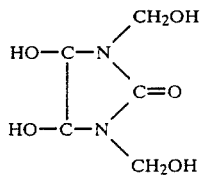

Melamine resins typically include aminoplasts such as melamine, benzoquanamine, acetoquanamine, and urea resins such as ureaformaldehyde. Commerially available aminoplasts which are water soluble or water dispersible for the instant purpose include Cymel 301, Cymel 303, Cymel 370, and Cymel 373, all being products of American Cyanamid, said aminoplasts being melamine based, e.g., hexamethoxy-methyl melamine or methylated or butylated ureas. Other suitable aminoplast resins are of the type produced by the reaction of aldehyde and formoguanamine; ammeline; 2-chlor-4,6-diamine-1,3,5-triazine; 2-phenyl-p-oxy-4,6-diamino-1,3,5-triazine; and 2,4,6-triethyl-triamino-1,3,5-triazine. The mono-, di-, or triaryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

In practice, the ethylenic monomers can be polymerized in an aqueous medium at a pH preferably between about 1.0 and 6 to form a reactive emulsion polymer. Generally, the polymerization is conducted at a temperature of about 20°–100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxygen compound such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. The amount of initiator used will generally be in the range between about 0.1 to 3% by weight based on the monomers and preferably is maintained between 0.15 and 0.8% by weight. Usually the initiator will all be charged at the outset of the polymerization, however, incremental addition or proportioning of the initiator is often employed.

When an emulsifier is used to prepare the latices of this invention, they are the general types of anionic and non-ionic emulsifiers. Examplary anionic emulsifiers which may be employed are: alkali metal or ammonium salts of the sulfates of alcohols having from 8 to 18 carbon atoms, such as sodium lauryl sulfate; ethanolamine lauryl sulfate, ethylamide lauryl sufate; alkali metal and ammonium salts of sulfonated petroleum or paraffin oils, sodium salts of aromatic sulfonic acids, such as dodecane-1-sulfonic acid and octadiene-1sulfonic acid; aralkylsulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used may be from about 0.01 to 6% or more by weight of the monomers. All of the emulsifier may be added at the beginning of the polymerization or may be added incrementally or by proportioning throughout the run. Typical polymerizations for the preparation of the self-emulsion latices of this invention are conducted by charging the monomers into the polymerization reactor which contains water and a portion of the emulsifying agent. The reactor and its contents are heated and the initiator added.

The preferred emulsion latex polymer can contain by weight between 0% and 20% acrylamide or methacrylamide, and between 0% to 10% carboxylic acid monomer, and from 0% to 20% alkylhydroxy monomer provide at least 10% of reactive functional monomer is copolymerized, with the balance being other ethylenically unsaturated monomer. The thermosetting composition of this invention can contain between 5% and 55% weight glycoluril derivative or melamine with the remaining being reactive polymer. The preferred compositions contain between 10 and 35 weight parts or glycoluril or melamine per 100 weight parts reactive polymer.

The thermosetting compositions cure quickly at low temperatures under either basic or acidic curing conditions although a faster cure results under acidic conditions. Acid catalyst such as p-toluene sulfonic (ptsa) acid is useful for accelerating the cure. The thermosetting composition can be used as a clear coating or as a pigmented coating.

The merits of this invention are further illustrated in the following examples.

EXAMPLE 1

(a) Heat Reactive Latex. The following raw materials were reacted together in the manner indicated to produce a reactive latex.

| A. | Demineralized Water | 499.3 |
|---|---|---|
| | anionic emulsifier, | |
| | potassium salt of functional oligomer | |
| | Polywet KX-4 | 2.3 |
| B. | Butyl Acrylate | 6.7 |
| | Methyl Methacrylate | 13.3 |
| C. | Potassium Persulfate | 2.0 |
| | Demineralized Water | 6.7 |
| D. | Demineralized Water | 1.6 |
| E. | Butyl Acrylate | 235.4 |
| | Methyl Methacrylate | 320.4 |
| | Hydroxyethyl Acrylate | 26.9 |
| | Ethyl Acrylate | 67.2 |
| F. | Demineralized Water | 8.0 |
| G. | 2-propenoic acid acrylic copolymer | |
| | Acrysol ASE-60 | 1.3 |
| | Deminalized Water | 2.0 |
| H. | Dimethyl Ethanol Amine | 1.3 |
| | Deminalized Water | 5.3 |
| I. | Preservative Nuosept 95 | 0.3 |
| J. | Melamine Cymel 373 | 111 |
| | Deminalized Water | 50 |

Procedure: A was heated to 80° C. under a nitrogen blanket and B was then added. After 10 minutes, C was added and the line rinsed with D. After about 10 minutes, E was fed in over 5 hours. One hour after E was added the batch was cooled to 45°–50° C. and F plus G were added. The amine solution H was then added and after mixing 20 minutes I was added. This completed reactive latex was then mixed with J and heated up to 70° C. and held at 70° C. for 2 hours. The batch was then cooled, filtered and stored. Paint was made at this point since this was reacted in the melamine resin.

EXAMPLE 2

A clear unpigmented coating was prepared based on a latex of monomer composition styrene (76.6), ethyl acrylate (11.5), hydroxyethyl acrylate (6), methacrylic acid (4) and N-methylol acrylamide (1.9). The latex was heat reacted at 80° C. for one hour in the presence of Cymel 1172 which is a glycoluril. When greater than 20% by weight of crosslinker was present in this process, catalyzed with ptsa and drawn down on paper overlay luan board, improved clarity, gloss, "enamel holdout" and block resistance was observed.

The foregoing illustrates the merits of this invention and particularly better dispersion of the crosslinker into the latex resulting in films displaying better clarity and gloss as well as improved holdout over porous substrates. This can be achieved at lower crosslinker levels than is used in a normal cold blend of latex and crosslinker(s).

The foregoing description and examples are illustrative but are not intended to be limiting except by the appended claims.

In the claims:

1. In a process for producing an aqueous coating composition comprising a glycoluril derivative and a reactive aqueous emulsion polymer wherein the coating composition is adapted to be heat cured to cross-link the glycoluril derivative with the reactive aqueous emulsion polymer, the improvement comprising:
   heat reacting an aqueous polymeric mixture comprising by weight between about 5% and 55% glycoluril derivative and between 45% and 95% of a preformed reactive aqueous emulsion polymer at temperatures between about 60° C. and 90° C. for time sufficient less than two hours to partially heat react said glycoluril derivative with said reactive aqueous emulsion polymer to provide a minor amount of coreaction between the glycoluril derivative and the reactive aqueous emulsion polymer without gelling the polymeric mixture, the reactive aqueous emulsion polymer containing reactive hydroxyl, carboxyl, or acrylamide groups for coreacting with said glycoluril derivative.

2. The process in claim 1 wherein the glycoluril derivative comprises between 10 and 35 weight parts per 100 weight parts of said reactive aqueous emulsion polymer.

3. The process in claim 1 wherein the glycoluril derivative is a dimethylol dihydroxy ethylene urea.

4. The process in claim 1 wherein the heat reaction time is between 0.5 and 1 hour.

5. The heat reacted product of the process of claim 1.

* * * * *